United States Patent
Thornton-Trump

[15] 3,667,190
[45] June 6, 1972

[54] ORCHARD MACHINE

[72] Inventor: Walter E. Thornton-Trump, 1544 Knareswood Drive, Port Credit, Ontario, Canada

[22] Filed: June 11, 1970

[21] Appl. No.: 45,295

[52] U.S. Cl..................................53/59, 53/391, 198/45, 198/69, 214/83.1
[51] Int. Cl...................................B65b 57/00, B65g 47/44
[58] Field of Search................ 193/7; 214/83.1, 17, 17 CB, 214/672; 56/328 R; 198/33 AA, 45, 69; 53/391, 59

[56] References Cited

UNITED STATES PATENTS

| | | |
|---|---|---|
| 2,913,028 | 11/1959 | Hait..............................198/33 AA X |
| 3,054,520 | 9/1962 | Maloney..........................214/672 X |
| 3,182,827 | 5/1965 | Frost..............................214/83.1 |
| 3,493,132 | 2/1970 | Merrill............................214/83.1 |
| 2,905,262 | 9/1959 | Zwight............................214/83.1 |
| 3,243,061 | 3/1966 | McKeown..........................214/83.1 |
| 3,537,236 | 11/1970 | Fridley...........................214/83.1 |

Primary Examiner—Edward A. Sroka
Assistant Examiner—W. Scott Carson
Attorney—Zarley, McKee & Thomte

[57] ABSTRACT

A three wheeled orchard machine having a boom which raises and lowers a picker's platform. The platform is levelled by a conveyor housing which acts both as a levelling rod and to convey picked fruit to a lower conveyor. The lower conveyor delivers the fruit to a bin filler mechanism, which is also levelled by a levelling rod. The bin filler mechanism has a fixed bottom, and a rotating sidewall having apertures therein. As the sidewall rotates, the fruit is distributed evenly in a bin located below the bin filler mechanism. A microswitch in the bottom of the rotating sidewall causes the bin filler mechanism to lift as the level of fruit in the bin increases. The bin filler mechanism and the upper and lower conveyors are all driven from one hydraulic motor.

10 Claims, 11 Drawing Figures

PATENTED JUN 6 1972

INVENTOR.
WALTER E. THORNTON-TRUMP

BY Rogers, Bereskin & Parr

INVENTOR.
WALTER E. THORNTON-TRUMP
BY Rogers, Bereskin, & Parr

INVENTOR.
WALTER E. THORNTON-TRUMP

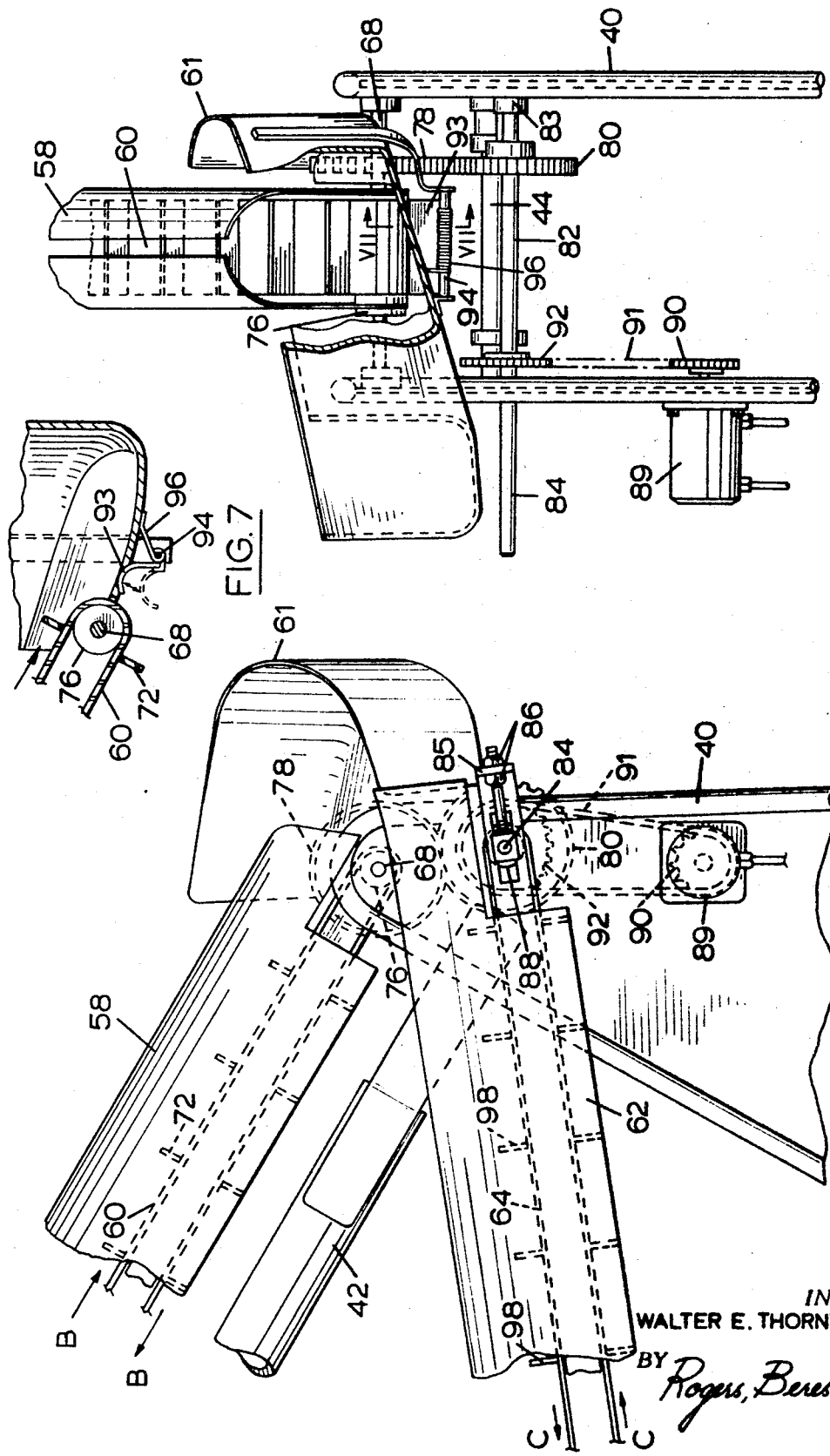

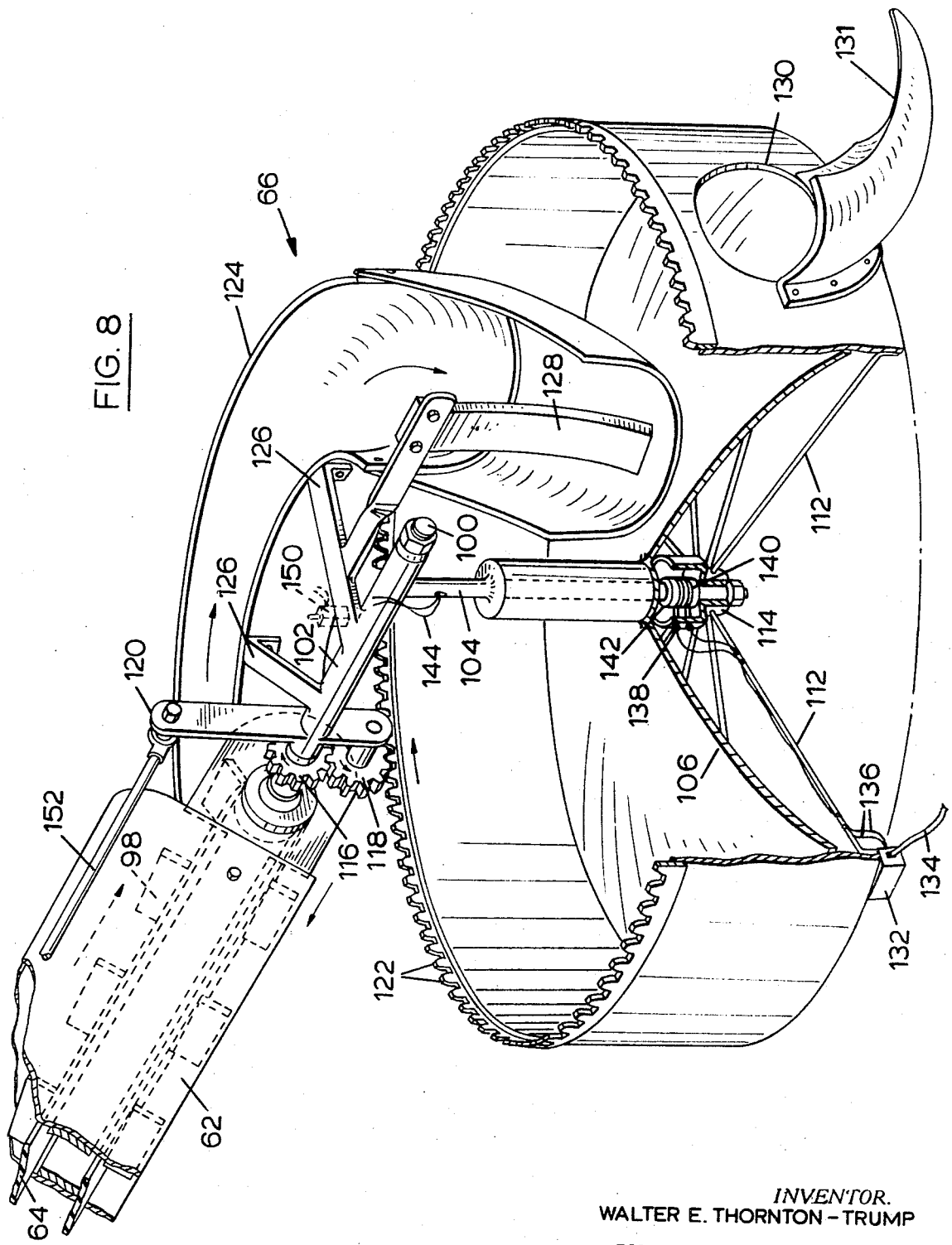

INVENTOR.
WALTER E. THORNTON-TRUMP

BY Rogers, Bereskin, & Parr

ORCHARD MACHINE

This invention relates to a self propelled orchard machine for supporting and aiding a worker engaged typically in orchard work, such as picking apples or other fruit from trees.

Many types of orchard machines have been designed and built in the past. These prior art machines have various advantages and disadvantages, but one feature generally lacking from the prior art machines is an efficient and integrated system for handling the fruit picked by the picker using the machine.

Accordingly, it is an object of the present invention to provide a machine that is simple in construction and efficient in operation. A typical machine according to the invention includes a frame having a boom support thereon, and a boom pivotally connected to the boom support. A platform for an operator is pivotally connected to the free end of the boom. Also extending between the boom support and platform is a conveyor frame containing a conveyor. The conveyor frame is pivotally connected to the boom support and platform so as to form a parallelogram with the boom, so that the conveyor frame performs two functions. Firstly, the conveyor frame acts as a levelling rod to maintain the platform level as the boom is raised and lowered, and secondly, the conveyor frame houses the conveyor for transporting articles downwardly from the platform.

Further objects and advantages of the invention will appear from the following disclosure, taken together with the accompanying drawings, in which:

FIG. 5 is a side view showing the mounting of the discharge end of the upper conveyor and the inlet end of the lower conveyor on the boom support;

FIG. 6 is an end view of the portions of the machine shown in FIG. 4;

FIG. 7 is a sectional view along lines VII—VII of FIG. 6;

FIG. 8 is a perspective view of the bin filler mechanism.

Figures 1, 1A:
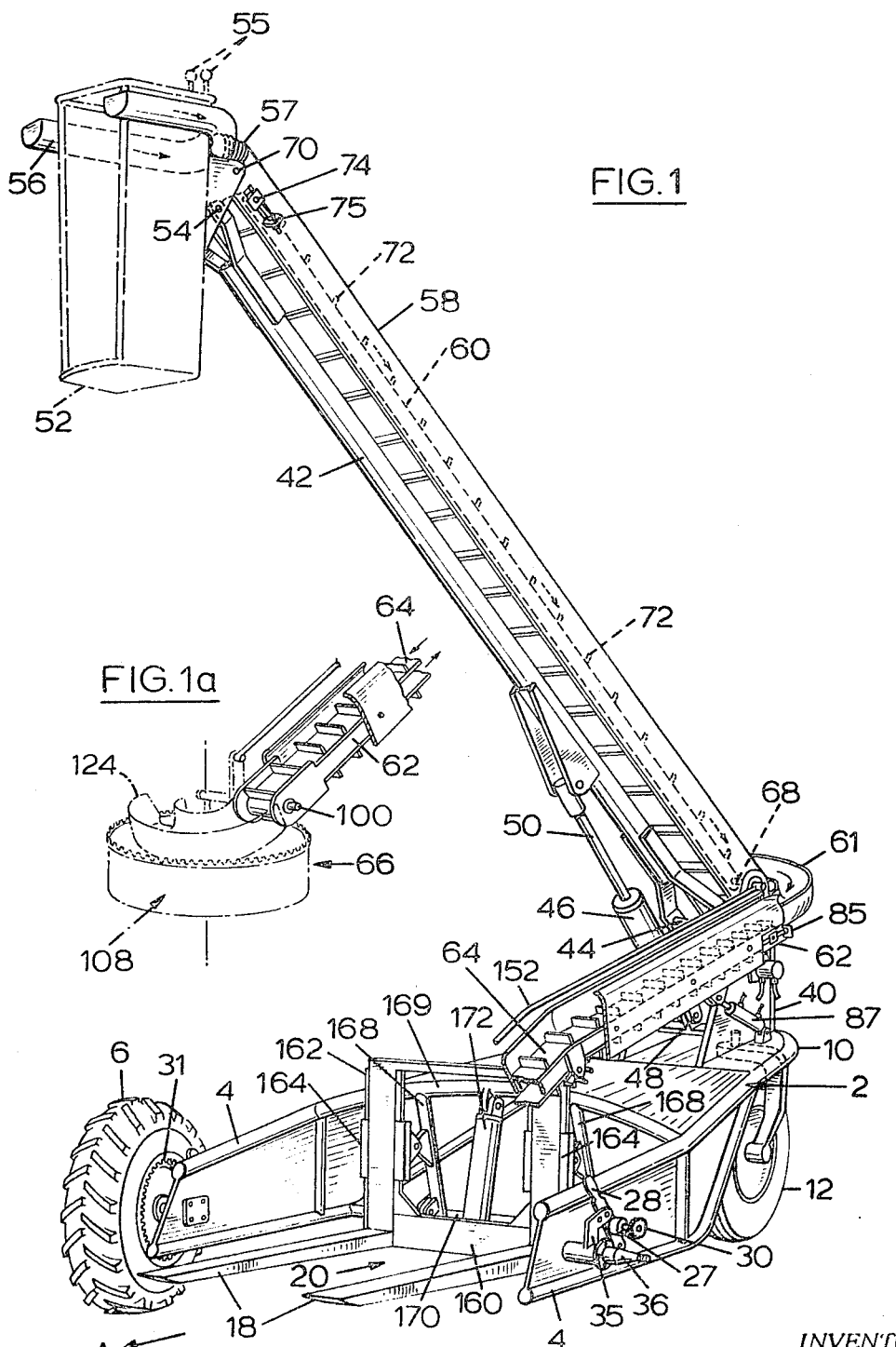
FIG. 1 is a perspective view, partly broken away, showing a machine according to the present invention.
FIG. 1A is a perspective view showing the bin filler mechanism and part of the lower conveyor of the machine of FIG. 1.
Figure 2:
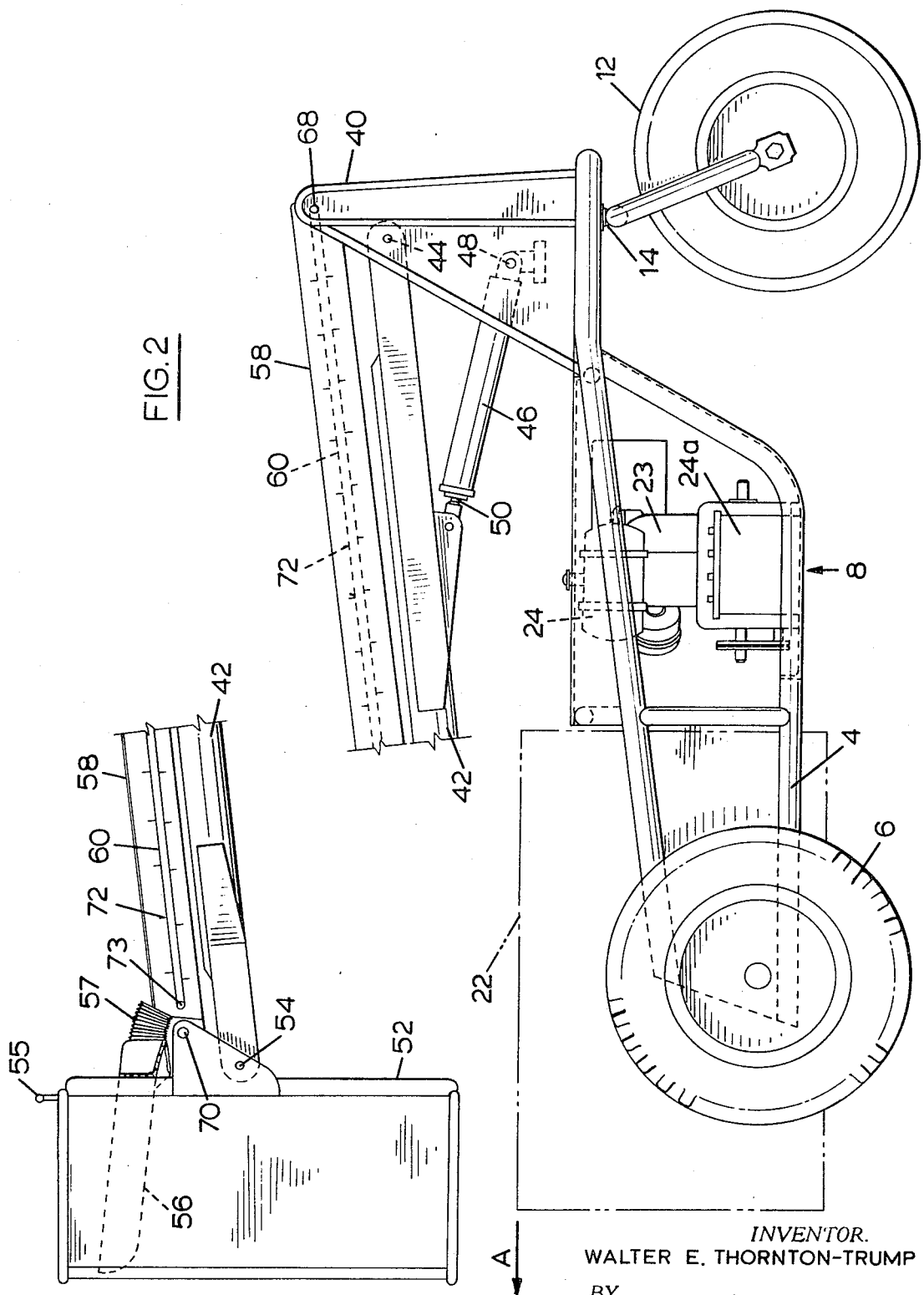
FIG. 2 is a side view showing the machine of FIG. 1, with the lower conveyor housing, intermediate slideway to the upper conveyor, bin filler mechanism, and fork lift removed, in order to show more clearly the remaining elements of the machine.
Figure 3:
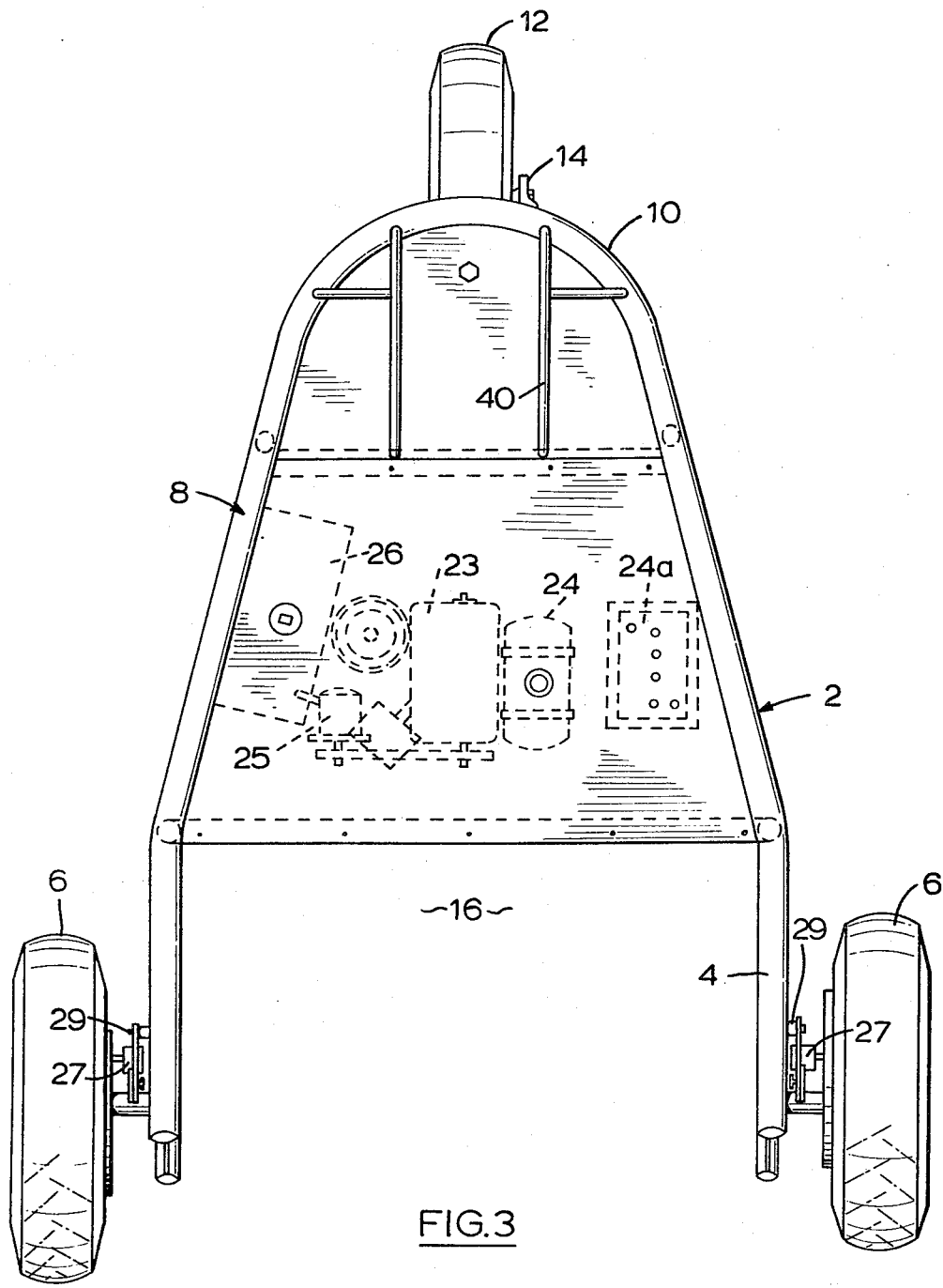
FIG. 3 is a top view of the machine as shown in FIG. 2 but with the boom, platform, and upper conveyor removed, to show the frame layout.

Reference is first made to FIGS. 1 to 3, which show most of the elements of a typical orchard machine according to the invention. The machine includes a main frame 2 shaped generally in the form of a capital V as view from above and made of tubular steel. The main frame has a front part consisting of two spaced side frame sections 4, on each of which is mounted a drive wheel 6. The main frame 2 also includes a central portion 8 (FIGS. 2, 3) supporting drive machinery to be described, and a rear portion 10 on which a single wheel 12 is mounted by means of a castor mounting 14. When travelling from one location to another, the machine will normally travel in the direction of arrow A, being steered by individual operation of the drive wheels 6.

It will be noted that the front frame side sections 4, together with the central portion 8, define an open ended space 16 (FIG. 3). The space 16 is provided to accommodate the prongs 18 of a fork lift generally indicated at 20 (FIG. 1), and to accommodate a bin 22 (FIG. 2) positioned on the prongs 18.

The machine is typically powered by an internal combustion engine 23 (FIGS. 2, 3) supplied with gasoline from a fuel tank 24 and electricity from a battery 24a. The engine 23 drives a hydraulic pump 25 which pressurizes the oil from a tank 26. The arrangement of engine, fuel tank, pump, oil tank and battery in the central portion 8 ensures that the weight of these relatively heavy components is centered in the machine.

Figure 4:
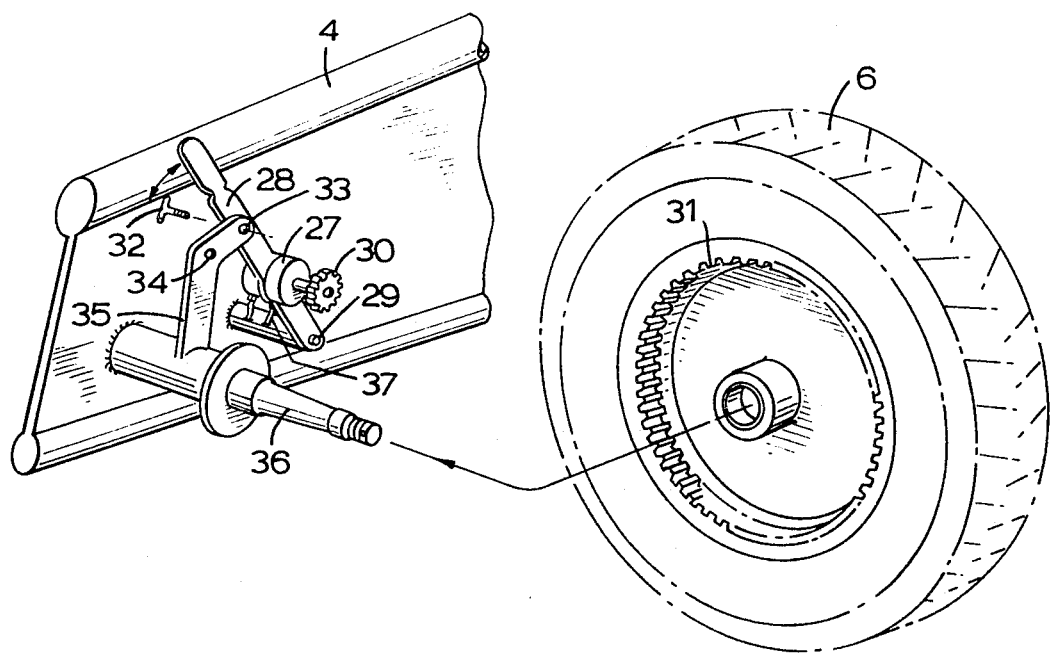
FIG. 4 is a perspective view showing the arrangement for powering the drive wheels of the machine.

The high pressure oil delivered by pump 25 is used to operate hydraulic motors 27 (see FIGS. 1, 4) mounted on bars 28 which are pivotally mounted at 29 on the frame. Each hydraulic motor 27 contains a projecting driven shaft having a spur gear 30 at its end. The gear 30 is of a type adapted to fit within and drive an internal ring gear 31 formed in rim of each drive wheel 6.

Each hydraulic motor 27 can be pivoted on its bar 28 to a position in which its spur gear is engaged with or disengaged from ring gear 31, by grasping the free end of bar 28. The motors 27 can be locked in engaged or disengaged position by a threaded pin 32. The pin 32 passes through a hole (not shown) in bar 28 and then screws into a selected one of two threaded holes 33, 34 in a lock bar 35 fixed to the axle 36 for the wheel (the axle being fixed to the frame 2).

When the pin 32 passes through bar 28 into hole 33, the spur gear 30 engages ring gear 31 to drive the wheel, while when pin 32 extends through bar 28 into hole 34, the hydraulic motor gear 30 is disengaged. Flexible oil lines 37 to the hydraulic motors permit this movement, so that a simple arrangement is provided for driving the wheels or locking them out of drive for towing.

Referring again to FIGS. 1 and 2, the rear portion 10 of the frame includes an upstanding boom support 40 which carries a boom 42. The boom 42 is pivotally connected to the support 40 by a pivot shaft 44. The boom is moved between a raised position (shown in FIG. 1) and a lowered position (shown in FIG. 2) by a cylinder 46 pivotally connected at 48 to the support 40, the cylinder having a piston rod 50 pivotally connected to the boom. When the boom is in its lowered position, it projects well forwardly of the drive wheels 6.

At its free end the boom carries a platform 52 to support an operator. The platform 52 is connected to the boom by a pivot rod 54 located slightly more than midway up the height of the platform. The basket contains controls diagrammatically indicated at 55, for controlling up and down motion of the boom, for controlling the individual motors 27 for the drive wheels 6 so that each wheel may independantly be operated in forward or reverse, for operating the fork lift 20, and for operating the conveyor system to be described. There will normally be one set of foot controls for each of the two hydraulic motors 27, one handle control for the fork lift 20, and handle controls for the conveyor system. The linkages and hydraulic system are not shown, since these embody standard techniques well known to those skilled in the art.

The details of the conveyor system of the machine will next be explained. The machine includes an upper picking trough 56 (FIGS. 1, 2) extending around both sides and the rear of the platform, and terminating in a flexible discharge hose 57. The trough 56 slants downwardly toward the hose 57, so that fruit will roll toward the hose 57.

The machine also includes an upper conveyor frame 58 extending from the picking trough discharge hose to the boom support 40. The frame 58 encloses an upper conveyor belt 60. From the discharge end of upper conveyor frame 58, an intermediate curved slideway or chute 61 extends to the inlet end of a lower conveyor frame 62. Conveyor frame 62 normally extends downwardly from the boom support 40, and holds a lower conveyor belt 64. Mounted at the bottom end of the lower conveyor frame 62 is a bin filler mechanism 66 to be described presently.

The upper conveyor frame 58 is pivotally connected to the boom support by a pivot shaft 68 (FIGS. 1, 2) and is pivotally connected to the platform 52 by another pivot shaft 70. The pivot shafts 68 and 70, together with the pivot shafts 44 and 54 for the boom, form a parallelogram as viewed from the side.

Thus, the upper conveyor frame 58 acts as a levelling rod to maintain the platform 52 level as the boom is raised and lowered, and also acts as a housing for the upper conveyor belt 60.

The upper conveyor belt 60 includes a number of flexible upstanding holders 72 along its length, and is supported by conventional idler shafts (not shown) spaced along the frame 58. At the platform end of the frame 58, the upper conveyor belt 60 turns about an idler roller 73 mounted on a shaft 74. Shaft 74 is mounted adjustably on a belt tightener 75 provided to adjust the tension of the upper conveyor belt.

At its lower or discharge end, the upper conveyor belt 60 turns about a drive roller 76 (FIGS. 5 and 6) rotatably mounted on the pivot shaft 68 connecting the upper conveyor frame 58 to the boom support. Fixed to the drive roller 76 is an upper drive gear 78 in mesh with a lower drive gear 80 fixed to a shaft 82. The shaft 82 is journalled in bushings 83 in the boom support 40 and projects beyond the side of the boom support, as shown at 84 (FIG. 5).

The lower conveyor frame 62 is fixed at its upper end to the frame of a belt tension adjuster 85 which in turn is pivotally mounted on the projecting portion 84 of shaft 82. In effect, therefore, the upper end of lower conveyor frame 62 is mounted on shaft portion 84. Nuts 86 are provided to move the entire lower conveyor frame 62 relative to shaft portion 84, to adjust the tension of the lower conveyor belt 64. The degree of movement needed to adjust the belt tension is slight. The lower conveyor frame 62 is further supported (FIG. 1) by a piston and cylinder 87 connected to boom support 40, so that the frame 62 with the bin filler mechanism can be raised or lowered as desired.

Drive for the lower conveyor belt 64 is provided by a drive roller 88 fixed to shaft portion 84, and power for both conveyor belts is provided (FIGS. 5, 6) by a hydraulic motor 89, via a sprocket 90, chain 91, and a further gear 92 fixed to the shaft 82. It will be noted that since the upper and lower drive gears 78, 80 are mounted coaxially with the pivotal axes of the conveyor frames (i.e. on shafts 68, 82), the drive gears 78, 80 always remain in mesh as the boom 42 or the lower conveyor frame 62 or both are raised and lowered. The upper belt rotates in the direction of arrows B, and while the lower belt rotates in the direction of arrows C.

The discharge end of the upper conveyor is spaced slightly from slideway 61 to allow a gap through which the flexible holders 72 on the upper conveyor belt 60 may pass. To prevent articles from catching in this gap, a spring loaded bridge plate 93 (FIGS. 6, 7) is provided. Bridge plate 93 is pivotally mounted at a shaft 94 supported from slideway 61, and contains an upper curved portion normally biased by spring 96 to a position where it bridges the gap between conveyor belt 60 and slideway 61. As each conveyor holder 72 contacts bridge plate 93, it forces the bridge plate downwardly as shown in dotted lines in FIG. 7 until the conveyor holder moves out of engagement with the bridge plate. The bridge plate 93 then snaps back to its position shown in full lines in FIG. 7.

The lower conveyor belt 64 contains a number of similar flexible holders 98, which squeeze through a suitable gap between the inlet of the lower conveyor frame 62 and the slideway 61. The upward movement of holders 98 at this point tends to clear jammed articles without the need for a bridge plate.

The lower conveyor belt 64 turns at its discharge end around a roller fixed to a shaft 100 (FIGS. 1A, 8) so that shaft 100 rotates with the conveyor. The shaft 100 projects from the lower conveyor frame 62 into a bushing 102 which forms part of the bin filler mechanism 66. The bushing 102 includes a vertical arm 104 depending therefrom to which arm is fixed the bottom 106 of a bin filler tray 108. Bottom plate 106 slopes fairly sharply downwardly from its center to its edges.

The sidewall 110 of the bin filler tray is not connected to the bottom plate, but instead is spaced by a slight clearance therefrom and then is supported by spokes 112 extending below bottom plate 106 to a bushing 114 rotatably journalled on vertical arm 104. The sidewall 110 is thus rotatable about the bottom plate 106.

Power to rotate the sidewall 110 is supplied by a gear 116 fixed to rotating shaft 100 and turning another gear 118. Gear 118 is rotatably mounted on a bar 120 extending from bushing 102 and engages teeth 122 extending around the top rim of the sidewall 110. Thus, as the lower conveyor belt 64 turns, shaft 100 turns, turning gears 116, 118 to rotate the sidewall 110.

Articles being conveyed by the lower conveyor are directed into the bin filler tray 108 by a lower slideway 124 supported by metal straps 126 connected to the bushing 102. A flexible rubber strap 128 retards the speed of articles travelling down the slideway. Articles entering the bin filler tray 108 from slideway 124 roll from the center of the bottom plate 106 to its edges and then through a hole 130 in the rotating sidewall onto a plastic slide 131 and into the bin 22 (FIG. 2) located therebelow. The slide 131 is provided to minimize the impact on articles entering the bin 22.

In order to keep the bin filler tray 108 just above the level of articles in the bin 22, an automatic control system for the lower conveyor piston and cylinder 87 is provided. This control system includes a microswitch 132 mounted on the bottom of the sidewall 110 of the bin filler tray and having a movable element 134 which contracts articles in the bin when the level of these articles rises sufficiently. Microswitch 132 has a pair of leads 136 which extend along one of the spokes 112 and up to a pair of brushes 138 insulatedly mounted in the bushing 114. The brushes 138 are spring biased to press against two copper slip rings 140 fastened to an insulating ring 142 mounted above the bottom of shaft 104. Leads 144 extend from the slip rings 140 along the lower conveyor frame 62 to the central area of the vehicle frame.

Figure 9:
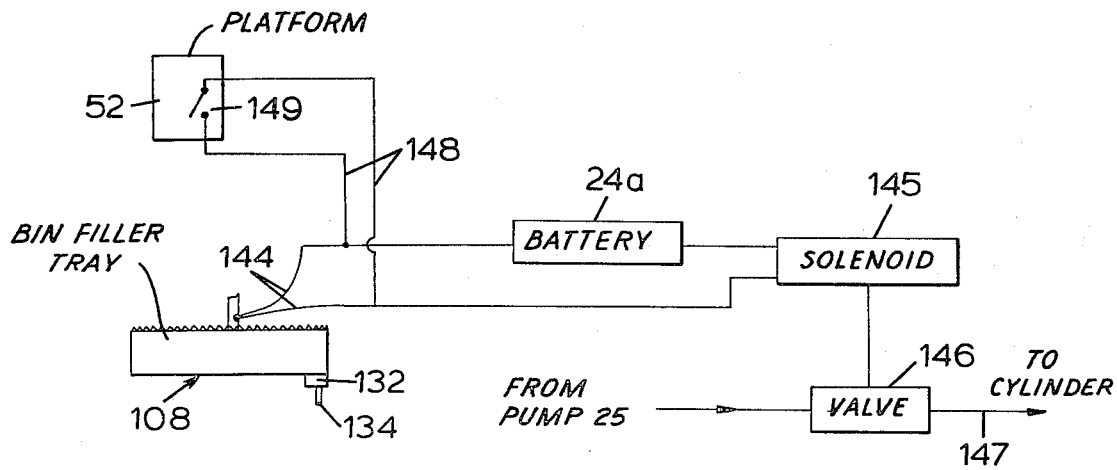
FIG. 9 is a block diagram of a control system for raising the lower conveyor and bin filler mechanism of the FIG. 1 machine.

In the central area of the vehicle frame, the leads 144 are connected (FIG. 9) to a solenoid 145 which when energized operates a valve 146. Valve 146 then conducts pressurized oil from pump 25 through an oil line 147 to operate piston and cylinder 87 to raise the lower conveyor frame. A further pair of leads 148 extends from solenoid 145 to a switch 149 on the platform 52, so that the lower conveyor frame can be raised or lowered from the platform.

Because the bin filler mechanism 66 extends sideways below the lower conveyor frame, there is a danger that an operator may lower the upper boom 42 while the lower conveyor frame is raised and thus bend the bin filler mechanism support shaft 100. To prevent this, a further switch 150 (shown in dotted lines in FIG. 8) can be placed on bushing 102. Switch 150 is positioned to be contacted by boom 42 when the boom is lowered (if the lower conveyor frame is raised) and is connected to means (not shown) to lower the lower conveyor frame when it is actuated.

As the lower conveyor frame 62 is lifted, the bin filler tray 108 is kept level by a levelling rod 152 (FIGS. 1, 8). Rod 152 is pivotally connected between bar 120 projecting from bushing 102, and the end of the shaft 68 at the discharge end of the upper conveyor. The arrangement is such that levelling rod 152 forms a parallelogram with the lower conveyor frame 62 at all times, as is usual for levelling rods.

In all cases, the microswitch movable element 134 will be the lowest element on the bin filler tray, to ensure that the tray is raised before it tends to crush or bruise articles in the bin 22.

Figure 10:
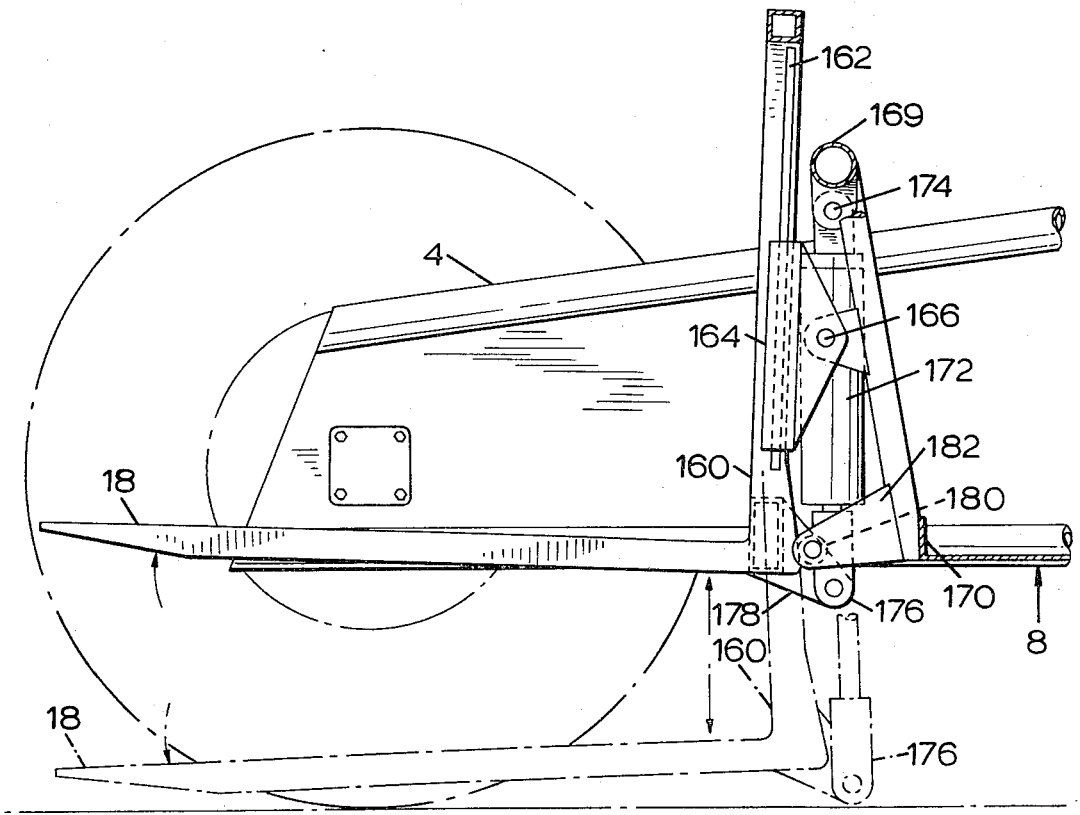
FIG. 10 is a side view showing the fork lift mechanism.

Reference is next made to the bin fork lift mechanism, best shown in FIGS. 1 and 10. As there shown, the prongs 18 of the fork lift are mounted on a heavy rectangular frame 160. The frame 160 includes a pair of guide rails 162 at each side thereof, the rails 162 being slidably located in grooved guides 164. Each guide 164 is pivotally connected at 166 to an upstanding tubular frame section 168 extending between an upper frame cross member 169 and a similar lower frame cross member 170 (FIG. 1).

The prongs 18 and supporting frame 160 are raised and lowered by a hydraulic cylinder 172 pivotally connected at 174 to the upper frame cross member 169. The cylinder 172 contains a piston (not shown) and piston rod having a connecting link 176 at its lower end (FIG. 10). The link 176 is pivotally connected to a link 178 connected in turn to the movable frame 160 of the fork lift.

The fork lift is shown in raised position in FIG. 1 and in raised position in full lines in FIG. 10. The lowered position for the fork lift is shown in dotted lines in FIG. 10. It will be noted that in its lowered position, the fork lift prongs 18 slant downwardly toward their tips, as is conventional. However, when the fork lift is raised, the fork lift prongs reverse their tilt and become upwardly slanting toward their tips. This occurs because, as the fork lift is raised, the lower edges of the fork lift frame 160 bear against rollers 180 journalled in mounts 182 on the upstanding frame members 168. The rollers 180 force the lower part of the fork lift frame 160 forwardly, tilting the prongs upwardly. This ensures that when the bin 22 is in raised position for filling, it will not fall off the prongs if the machine travels across rough ground.

The overall operation of the machine is as follows. Use of the machine will usually commence with the boom in its lowered position (FIG. 2), so that an operator may step into the platform 52. Since the lower conveyor frame 62 is located to the side of the upper conveyor frame 58, the conveyors do not interfere with each other when the boom is lowered, so long as the lower conveyor is also lowered. In addition, the bin 22 does not interfere with the boom 42, even when the fork lift is in raised position and boom 42 is lowered, because the fork lift is a short lift mechanism (typically about ten inches), and the bins 22 are made of a height such that their sides do not interfere with the boom.

After the operator has stepped into the platform, he will usually operate controls 55 to raise the boom and platform slightly. This does not disturb the conveyor system. Because the upper end of the upper conveyor belt 60 turns about roller 74 journalled adjacent the pivotal connection of the upper conveyor frame to the platform, the relation of the upper conveyor belt to the discharge hose 57 of the picking trough remains substantially unchanged. In addition, the conveyor drive gears 78, 80 at the lower end of the upper conveyor remain in mesh, as previously discussed.

The operator will usually next operate the controls 55 to move the machine to a desired location, e.g. to pick up a bin 22 on the fork lift prongs. Before the operator picks up the bin, he will operate controls 55 to lift the lower conveyor frame out of the way of the bin. After the operator has picked up a bin and raised the fork lift to its uppermost position, he will lower the lower conveyor until the bin filler tray 108 is adjacent the bottom of the bin. The bend illustrated in the lower conveyor frame near its bottom enables the bin filler tray 108 to be placed near the bottom of the bin.

The operator next drives the machine to a location in which he may commence picking fruit from a tree. He then raises the boom further so that he can reach desired locations in the tree. The location of the connection between the boom and platform, midway up the platform, facilitates raising the platform through "holes" in the tree foliage. Side to side swinging of the platform is achieved by individually controlling the drive wheels 6 in forward or reverse. This same system is used to steer the machine in its normal forward travel, as discussed.

The location of the engine, fuel tank, battery, oil pump and oil tank in the central portion of the machine, away from the center line of the drive wheels 6, provides good balance for the machine and eliminates the need for heavy counterweights. The added weight of the loaded bin 22, positioned over and slightly rearwardly of the drive wheels, assists in providing traction for the machine and in adding stability on rough or hilly terrain.

After the operator has elevated himself to a desired location, he starts hydraulic motor 89 to operate the upper and lower conveyor belts and the bin filler tray. He then begins depositing fruit in the picking trough. This fruit rolls downwardly through the discharge hose 57 onto the upper conveyor belt 60 and is carried downwardly at a rate determined by the speed of the hydraulic motor 89 and the drive gear ratios. The holders 72 on the belt prevent the fruit from rolling down the upper conveyor.

After the fruit is discharged from the upper conveyor belt 60, it rolls by gravity along the intermediate slideway 61 and then onto the lower conveyor belt 64. The fruit is discharged by the lower conveyor into lower slideway 124 and into the rotating bin filler tray, which directs it into the bin 22. As the bin fills, the microswitch 132 closes as it contacts articles, and the lower conveyor frame 62 rises, until the bin is full. The operator then simply deposits it and picks up a new bin. The bin filler mechanism provides relatively uniform filling of the bins, while reducing likelihood of damage to the fruit picked.

If desired, the entire bin filler tray 108 can be made rotatable (instead of just its sidewall). However, in that case the tray will contain a channel directing articles from slideway 124 to the aperture 130, to be sure that they reach this aperture.

What I claim as my Invention is:

1. A self-propelled orchard machine comprising:
a frame, including a boom support at one end thereof;
a boom mounted at a first pivotal axis on said boom support for pivotal movement in a vertical plane;
extensible power means having one end operatively connected to said boom at a point spaced from said first pivotal axis and having an opposite end operatively connected to said boom support for moving said boom between a raised and a lowered position;
a platform mounted at a second pivotal axis at the free end of said boom;
a conveyor means for conveying articles from said platform to said boom support, said conveyor means being pivotally connected to said boom support at a third pivotal axis and to said platform at a fourth pivotal axis,
said third and fourth pivotal axes defining a parallelogram with said first and second pivotal axes, so that said conveyor means serves as a leveling rod to maintain said platform in the same attitude as the boom is raised and lowered; and,
a chute located on said boom support adjacent said third pivotal axis to receive articles discharged from said conveyor means.

2. A self-propelled orchard machine according to claim 1 wherein said conveyor means includes a conveyor frame which extends between said third and fourth pivotal axes and a conveyor which is movably mounted on said conveyor frame for carrying articles from said platform to said boom support.

3. A machine according to claim 2 wherein a lower conveyor means has an inlet end connected to said boom support and has a discharge end, a slideway being mounted on said boom support for receiving articles from said upper conveyor and for transferring said articles to said inlet end of said lower conveyor means; said frame supporting a bin below said discharge end of said lower conveyor means.

4. A machine according to claim 3 wherein said lower conveyor means is hinged to said boom support for swinging movement about a horizontal axis so as to raise and lower said discharge end of said lower conveyor means; power means being connected to said lower conveyor means for raising and lowering said lower conveyor means; a switch carried adjacent said discharge end of said lower conveyor means; said switch being connected to said power means and being responsive to the rise of articles within said bin for causing said power means to lift said discharge end of said lower conveyor means.

5. A machine according to claim 1 wherein said frame has a forward and a rearward end and is shaped to define an open ended space adjacent said forward end, a fork lift being movably mounted within said open ended space for supporting a bin; power means being connected to said fork lift for moving said fork lift between a lower position adjacent the ground to an upper position spaced above the ground.

6. A machine according to claim 5 wherein said frame has a V-shape and the apex of said V-shape is said rearward end, a pair of drive wheels being mounted on said forward end, said boom support being at said rearward end and said boom extending forwardly from said boom support so as to place the center of gravity of said boom directly over said frame; said fork lift being mounted within the space between the lateral sides of said V-shaped frame.

7. A machine according to claim 5 wherein said fork lift includes prongs thereon, means being on said fork lift for tilting said prongs downwardly when said fork lift is in its lower position and for tilting said prongs upwardly when said fork lift is in its upper position.

8. A self-propelled orchard machine according to claim 1 wherein said platform is free from connection with leveling means other than said conveyor means.

9. A self-propelled orchard machine comprising:
a frame having a boom support thereon;
a boom pivotally mounted to said boom support for swinging movement in a vertical plane about a first pivotal axis;
means for moving said boom between a raised and a lowered position;
a platform mounted on the free end of said boom;
a conveyor means connected to said boom and having an upper end adjacent said platform and a lower end adjacent said frame; said conveyor means being adapted to convey articles from said platform downwardly towards said frame;
a bin supported by said frame adjacent said lower end of said conveyor means;
a bin filler mounted adjacent said lower end of said conveyor means for discharging articles received from said conveyor into said bin, said bin filler having a circular tray including a bottom plate fixed against rotation and sidewall encircling said bottom plate;
said sidewall being rotatable about a vertical axis and having a distribution aperture therein for discharging articles received from said conveyor means into said bin located therebelow; and
drive means for rotating said portion of said tray.

10. A machine according to claim 9 wherein said lower end of said conveyor means is movable upwardly and downwardly with respect to said bin; said bin filler being connected to said lower end of said conveyor means for movement therewith; power means being connected to said conveyor means for raising and lowering said lower end of said conveyor means; a switch means being on the lower part of said tray and being responsive to the rise of articles in said bin to actuate said power means for raising said lower end of said conveyor means.

* * * * *